(12) United States Patent
Monde

(10) Patent No.: US 12,479,516 B2
(45) Date of Patent: Nov. 25, 2025

(54) MULTIPURPOSE VEHICLE

(71) Applicant: Kubota Corporation, Osaka (JP)

(72) Inventor: Yuki Monde, Sakai (JP)

(73) Assignee: Kubota Corporation, Osaka (JP)

( * ) Notice: Subject to any disclaimer, the term of this patent is extended or adjusted under 35 U.S.C. 154(b) by 204 days.

(21) Appl. No.: 18/117,011

(22) Filed: Mar. 3, 2023

(65) Prior Publication Data

US 2023/0278642 A1 Sep. 7, 2023

(30) Foreign Application Priority Data

Mar. 4, 2022 (JP) .................................. 2022-033362

(51) Int. Cl.
*B62D 25/24* (2006.01)
*B62D 25/20* (2006.01)

(52) U.S. Cl.
CPC ......... *B62D 25/24* (2013.01); *B62D 25/2072* (2013.01)

(58) Field of Classification Search
CPC ...... B62D 25/24; B62D 25/2072; B60R 19/54
See application file for complete search history.

(56) References Cited

U.S. PATENT DOCUMENTS

2021/0094627 A1\* 4/2021 Clark .................... B62D 25/24

FOREIGN PATENT DOCUMENTS

| CN | 108705982 A | * | 10/2018 | |
|---|---|---|---|---|
| JP | S61192921 U | | 12/1986 | |
| JP | 68856 A | | 1/1994 | |
| JP | 201230681 A | | 2/2012 | |
| JP | 201713689 A | | 1/2017 | |
| JP | 201973199 A | | 5/2019 | |
| WO | WO-2019111999 A1 | * | 6/2019 | ............. B60K 11/04 |

OTHER PUBLICATIONS

TCM55; Engine Under Cover ? Splash Shield FYI; Club Lexus website; https://www.clublexus.com/forums/is-f-2008-2014/822970-engine-under-cover-splash-shield-fyi.html; accessed Feb. 3, 2025; published May 14, 2016. (Year: 2016).*
AutoPartsPrime.com; https://www.autopartsprime.com/lexus/engine-under-cover/OE-5141053081; Genuine Lexus 51510-53081 Engine Under Cover; accessed Feb. 3, 2025; no publication date.*
Lion Runner; Can you install RCI skids to your 4Runner on your own?; Youtube.com video; https://www.youtube.com/watch?v=rzoY7ilUxDQ; accessed Feb. 3, 2025; published Sep. 10, 2019. (Year: 2019).*

\* cited by examiner

*Primary Examiner* — Daniel J Colilla
(74) *Attorney, Agent, or Firm* — The Webb Law Firm

(57) ABSTRACT

A multipurpose vehicle, including: a drain outlet for waste fluid; a skid plate covering a body of the multipurpose vehicle from below and having an opening in an area facing the drain outlet; and a spread prevention section surrounding the opening and configured to prevent spread of liquid near the opening.

12 Claims, 4 Drawing Sheets

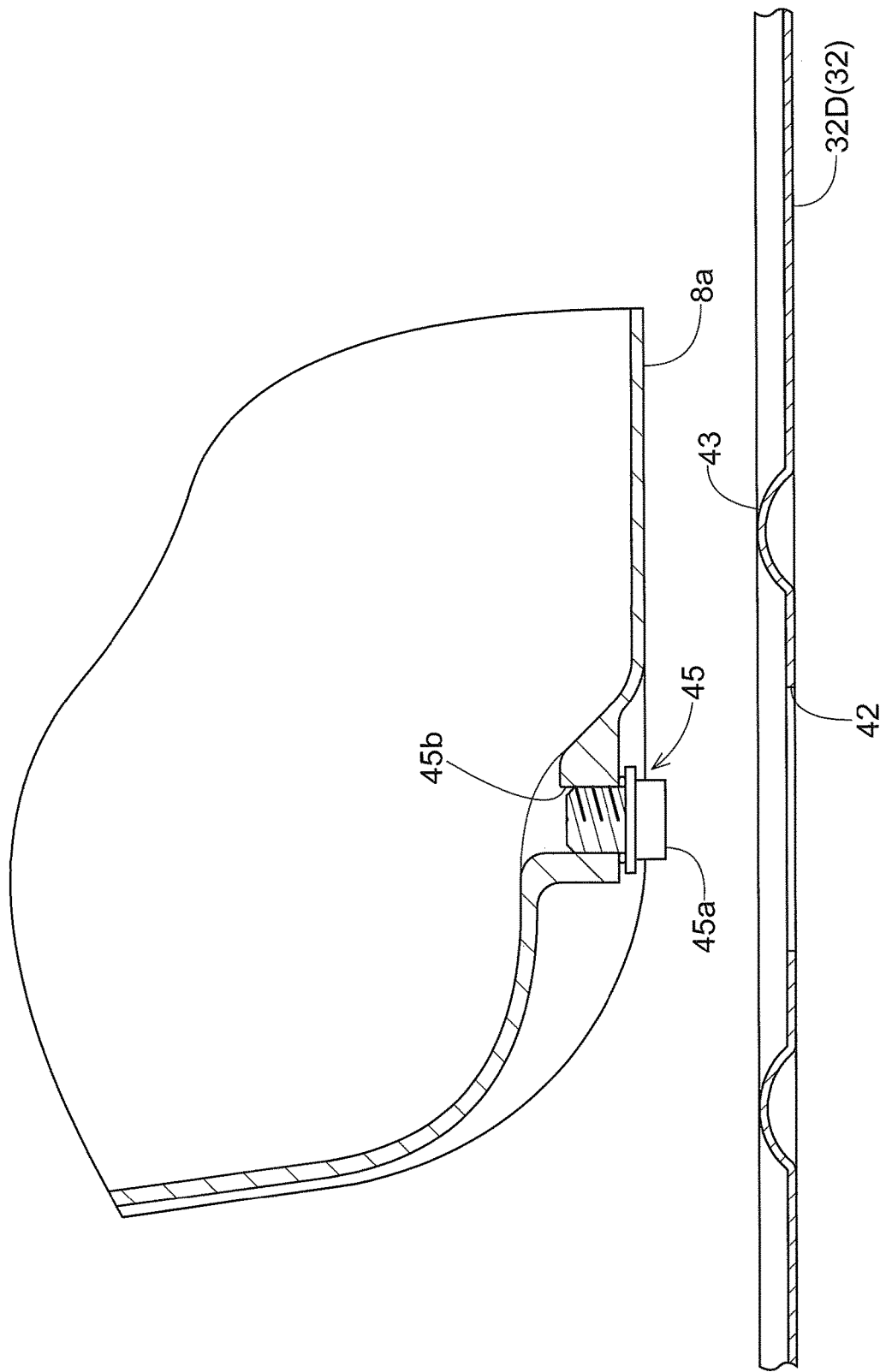

MULTIPURPOSE VEHICLE

CROSS-REFERENCE TO RELATED APPLICATION

This application claims priority to Japanese Patent Application No. 2022-033362 filed Mar. 4, 2022, the disclosure of which is hereby incorporated by reference in its entirety.

BACKGROUND OF THE INVENTION

Field of the Invention

The present invention relates to a multipurpose vehicle that has a skid plate for protecting a body of a vehicle from below, on a bottom face of the body.

Description of Related Art

Some types of multipurpose vehicles, such as a vehicle described in JP 2017-013689A, have an engine below a carrier. These vehicles also have an oil pan, in which engine oil is stored, at a bottom of the engine. Typically, the oil pan has a drain outlet for discharging the engine oil stored in the oil pan.

There are also multipurpose vehicles that have, on a bottom face of the body, a skid plate that covers the body of the vehicle from below and protects the engine and other members from stones or the like flying due to traveling of the vehicle. Some types of skid plates have an opening for letting the engine oil discharged from the drain outlet pass.

The above conventional technology lets the engine oil discharged from the drain outlet in the oil pan pass through the opening in the skid plate and collects the engine oil in a waste fluid container. At this time, the engine oil may stick to a region around the opening in the skid plate, and the sticking engine oil may spread over a wide area of the skid plate due to wind or the like. A wide area needs to be cleaned to remove the engine oil spreading on the skid plate, and this type of cleaning is troublesome due to the necessity for removing the skid plate.

Providing a larger opening is a conceivable method for preventing engine oil from sticking to the region around the opening in the skid plate, whereas there is a concern that a larger opening may deteriorate the capability to protect the engine from flying stones or the like. Further, the strength of the skid plate may be decreased by providing a larger opening.

SUMMARY OF THE INVENTION

In view of the foregoing problem, the present invention aims to provide a multipurpose vehicle in which waste fluid, such as engine oil, sticking to a skid plate is prevented from spreading over a wide area of the skid plate, and this waste fluid can be easily removed, without providing a larger opening.

A multipurpose vehicle of the present invention comprising:
 a drain outlet for waste fluid;
 a skid plate covering a body of the multipurpose vehicle from below and having an opening in an area facing the drain outlet; and
 a spread prevention section surrounding the opening and configured to prevent spread of liquid near the opening.

According to this characteristic configuration, even if a liquid substance such as engine oil sticks to a region around the opening section, the spread prevention section prevents spreading of the liquid substance. The spread prevention section being located at the outer peripheral area of the opening section makes the liquid substance remain in the outer peripheral area around the opening section. This liquid substance need only be wiped off via the opening section with use of cloth or the like, and the cleaning can be easily performed.

In the present invention, it is preferable that the spread prevention section has a protruding shape rising upward from an upper face portion of the skid plate.

According to this characteristic configuration, the spread prevention section can be formed only by raising a portion of the skid plate, and can be easily formed.

In the present invention, it is preferable that the multipurpose vehicle further comprises a reinforcement section extending from the spread prevention section toward a side opposite to a side where the opening section is located.

According to this characteristic configuration, the reinforcing section reinforces the outer peripheral area of the spread prevention section, and the strength of the opening section and the outer peripheral area of the spread prevention section can be increased.

In the present invention, it is preferable that the reinforcement section has a protruding shape rising upward from an upper face portion of the skid plate.

According to this characteristic configuration, the reinforcement section can be formed only by raising a portion of the skid plate, and can be easily formed.

In the present invention, it is preferable that the drain outlet is a drain outlet for discharging oil.

According to this characteristic configuration, even if oil discharged from the drain outlet for discharging oil sticks to the skid plate, the oil can be prevented from spreading on the skid plate.

In the present invention, it is preferable that the drain outlet is a drain outlet for discharging radiator cooling water.

According to this characteristic configuration, even if radiator cooling water discharged from the drain outlet for discharging radiator cooling water sticks to the skid plate, the radiator cooling water can be prevented from spreading on the skid plate.

BRIEF DESCRIPTION OF THE DRAWINGS

FIG. 4 is a cross-sectional view taken along a line indicated by arrows IV-IV in FIG. 3.

DESCRIPTION OF THE INVENTION

The front-back direction and the up-down direction in the embodiment of the present invention are as follows unless otherwise stated. "Front/forward" refers to the direction of an arrow F (see FIG. 1), "rear (back)/rearward" refers to the direction of an arrow B (see FIG. 1), "upper/above" refers to the direction of an arrow U (see FIG. 1), and "lower/below" refers to the direction of an arrow D (see FIG. 1). "Right/rightward" refers to the direction corresponding to the right side when the vehicle faces forward in the front-back direction, and "left/leftward" refers to the left side.

Overall Configuration

Figure 1:
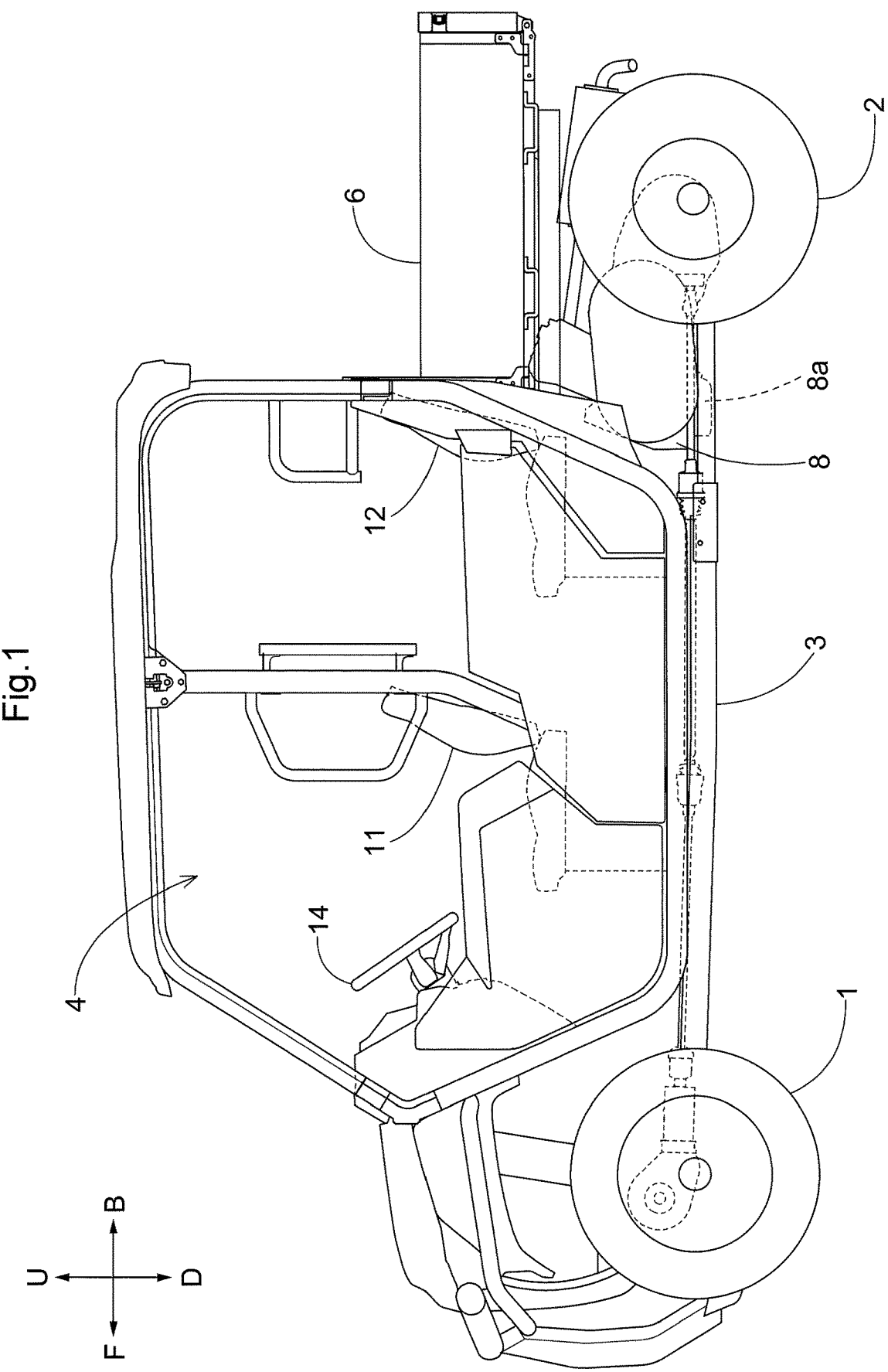
FIG. 1 is a side view of an entire multipurpose vehicle.

FIG. 1 shows a multipurpose vehicle. The multipurpose vehicle has a body of the vehicle that has a vehicle frame 3. A front part of the vehicle frame 3 supports left and right front wheels 1, and a rear part of the vehicle frame 3 supports left and right rear wheels 2. The body of the multipurpose vehicle includes a driving section 4 in which occupants can sit, between the front wheels 1 and the rear wheels 2. The body also includes a carrier 6 rearward of the driving section 4. The body also includes an engine 8 below the carrier 6 in a traveling body.

The driving section 4 includes a front seat 11 on the front side, and a rear seat 12 on the rear side. A driving panel 13, which is located forward of the front seat 11, includes a steering handle 14 for steering the front wheels 1.

Engine Configuration

The body of the multipurpose vehicle has an oil pan 8a at a bottom of the engine 8. Engine oil is stored in the oil pan 8a. A bottom face portion of the oil pan 8a has a drain 45 for discharging engine oil, as shown in FIG. 4. The drain 45 has a drain outlet 45b for waste fluid with a drain bolt 45a attached thereto. During maintenance work, engine oil stored in the oil pan 8a can be discharged by removing the drain bolt 45a.

Vehicle Frame Configuration

Figure 2:
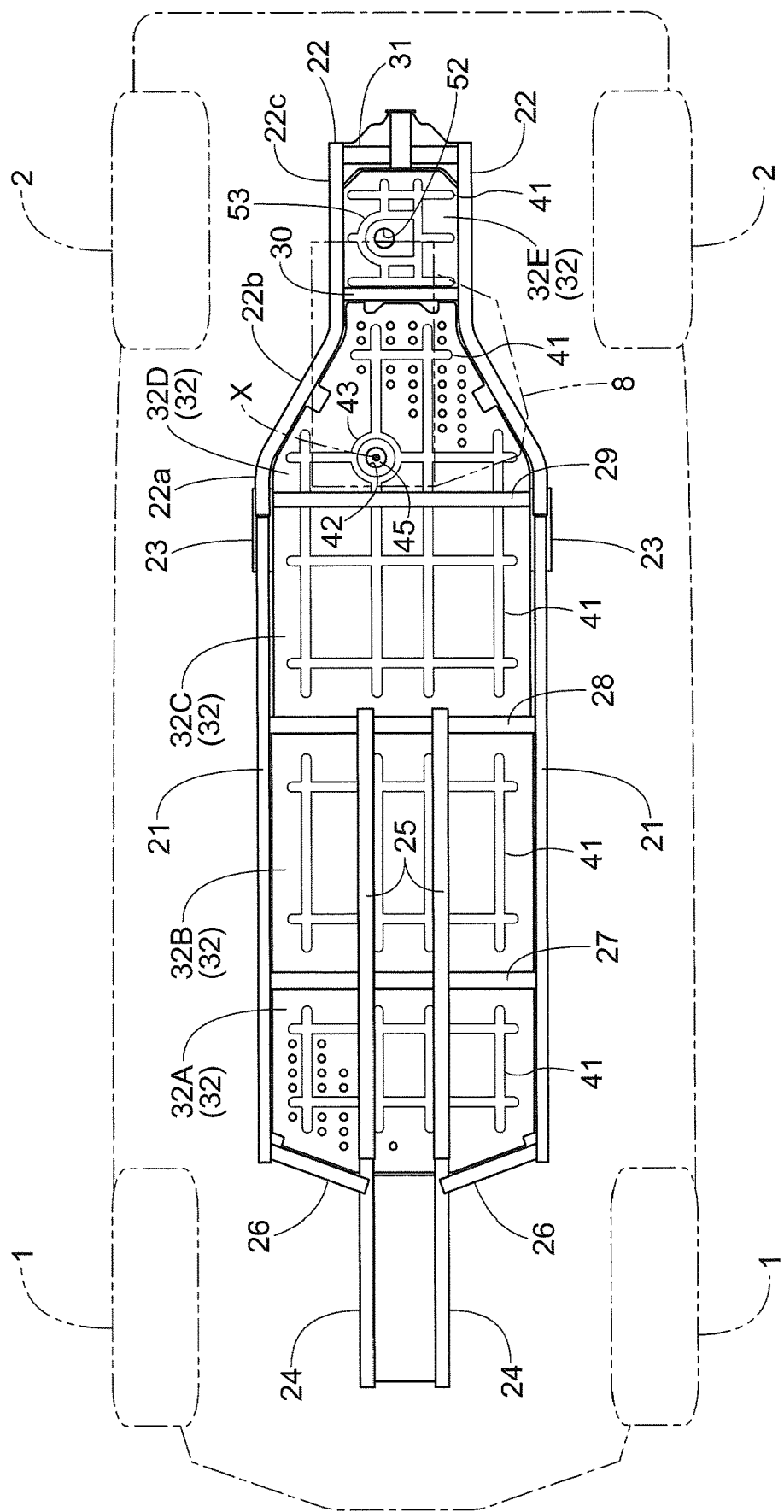
FIG. 2 is a plan view showing a configuration of a vehicle frame and a skid plate.
Figure 3:
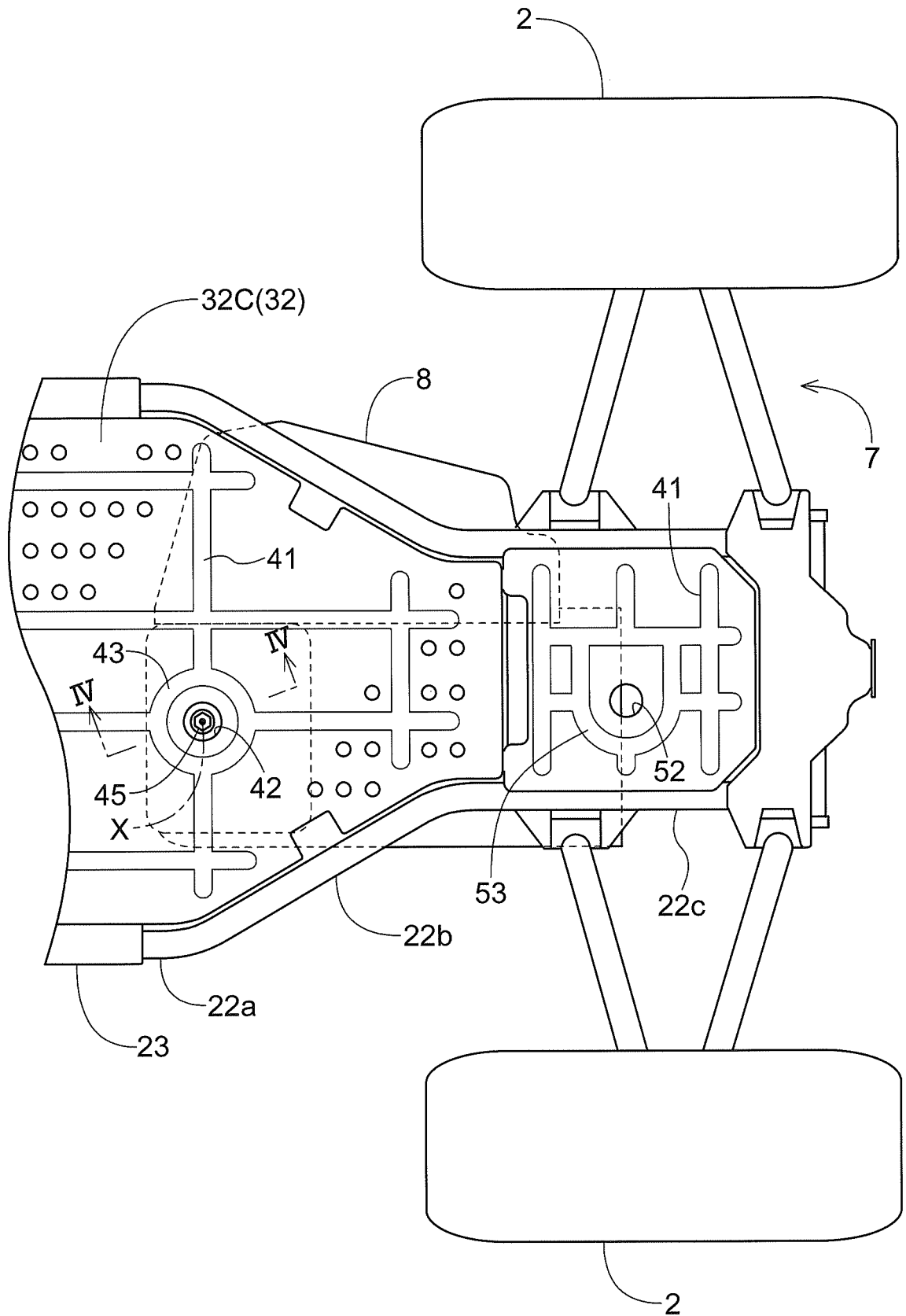
FIG. 3 shows a configuration of an opening portion and a spread prevention section.

The vehicle frame 3 supports the left and right front wheels 1 and the left and right rear wheels 2 in such a manner that the front wheels 1 and the rear wheels 2 can move in the up-down direction via a suspension mechanism 7 (see FIG. 3), as shown in FIGS. 1 to 3. The vehicle frame 3 is a framework that includes a plurality of frame bodies extending in the front-back direction, a plurality of frame bodies extending in a lateral direction, and a plurality of frame bodies extending in the vertical direction.

The plurality of frame bodies of the vehicle frame 3 that extend in the front-back direction include outer front frames 21 below the driving section 4, and rear lower frames 22 below the engine 8, as shown in FIG. 2. A pair of left and right outer front frames 21 and a pair of left and right rear lower frames 22 are joined via joint members 23 continuously in the front-back direction.

Each of the left and right rear lower frames 22 is constituted by a rectangular tubular material (rectangular pipe), and has a front section 22a continuous with a rear portion of a corresponding outer front frame 21 and extending in the front-back direction of the body, an intermediate inclined section 22b continuous with a rear portion of the front section 22a and inclined inward of the body while extending rearward, and a rear section 22c continuous with a rear portion of the intermediate inclined section 22b and extending in the front-back direction of the body. That is, the spacing between the left and right front sections 22a is the same as the spacing between the left and right outer front frames 21. Meanwhile, the spacing between the left and right rear sections 22c is smaller than the spacing between the left and right front sections 22a. The left and right rear lower frames 22 extend to positions corresponding to rear portions of the rear wheels 2.

Left and right front-back direction support members 25 extend in the front-back direction of the body on the inner side of the body relative to the left and right outer front frames 21. The front-back direction support members 25 extend from positions corresponding to the middle portions, in the front-back direction, of the outer front frames 21 to positions corresponding to the front ends of the outer front frames 21. Front-end portions of the left and right front-back direction support members 25 are connected, continuously in the front-back direction, to inner front frames 24 that extend forward in the front-back direction of the body. Each of the left and right inner front frames 24 is constituted by a rectangular tubular material (rectangular pipe). The left and right inner front frames 24 extend to positions corresponding to front portions of the front wheels 1.

Diagonal support members 26 extend between rear-end portions of the left and right inner front frames 24 and front-end portions of the left and right outer front frames 21. Each of the diagonal support members 26 is a straight member and is located further inward of the body as it extends forward.

The plurality of frame bodies of the vehicle frame 3 that extend in the lateral direction include a first lateral support member 27, a second lateral support member 28, a third lateral support member 29, a fourth lateral support member 30, and a fifth lateral support member 31.

The first lateral support member 27 extends between the left and right outer front frames 21 in an area that corresponds to the left and right outer front frames 21 and are rearward of the diagonal support members 26. The second lateral support member 28 extends between the left and right outer front frames 21 in an area that corresponds to the left and right outer front frames 21 and are rearward of the first lateral support member 27 and closer to the center in the front-back direction of the body.

The third lateral support member 29 extends between the left and right rear lower frames 22 in an area corresponding to front-end portions of the rear lower frames 22. The fourth lateral support member 30 extends between the left and right rear sections 22c in an area corresponding to front portions of the rear sections 22c. The fifth lateral support member 31 extends between the left and right rear lower frames 22 in an area corresponding to rear-end portions of the rear lower frames 22.

Skid Plate Configuration

The body of the multipurpose vehicle includes, at a bottom thereof, a skid plate 32, which covers the body of the vehicle from below, as shown in FIG. 2. The skid plate 32 includes a plurality of plates, which are attached between the left and right outer front frames 21 and between the left and right rear lower frames 22.

The plurality of plates that constitute the skid plate 32 include a first plate 32A, a second plate 32B, a third plate 32C, a fourth plate 32D, and a fifth plate 32E, which are perforated metal sheets each having a plurality of openings.

The first plate 32A is attached between the left and right diagonal support members 26 and the first lateral support member 27. The second plate 32B is attached between the first lateral support member 27 and the second lateral support member 28. The third plate 32C is attached between the second lateral support member 28 and the third lateral support member 29. The fourth plate 32D is attached between the third lateral support member 29 and the fourth lateral support member 30. The fifth plate 32E is attached between the fourth lateral support member 30 and the fifth lateral support member 31.

The skid plate 32 includes reinforcing ribs 41 (each of which corresponds to a "reinforcement section") for increasing the rigidity of the skid plate 32. The reinforcing ribs 41 linearly extend in the front-back direction and the left-right direction of the body. Each reinforcing rib 41 has a protruding shape that rises upward from an upper face portion of the skid plate 32, and is integrated with the skid plate 32 by means of bending.

The third plate 32C has an opening section 42 in an area opposing the drain outlet 45b of the oil pan 8a, as shown in FIGS. 2 and 3. The opening section 42 has a circular shape with a center X.

The body of the multipurpose vehicle includes a spread prevention section 43 for preventing spreading of liquid substance, such as engine oil discharged from the drain outlet 45b, sticking to a region around the opening section 42. The spread prevention section 43 is located around the opening section 42 of the third plate 32C.

The spread prevention section 43 surrounds the outer peripheral area of the opening section 42 of the third plate 32C. Specifically, the spread prevention section 43 is located in an area separated from the edge of the opening section 42 by a predetermined distance, and has a shape following the edge of the opening section 42. That is, the spread prevention section 43 is concentric with the opening section 42 around a center that is the center X of the opening section 42. The spread prevention section 43 has a protruding shape that rises upward from the upper face portion of the skid plate 32, and is integrated with the skid plate 32 by means of bending, as shown in FIG. 4.

The spread prevention section 43 is located at a position where a reinforcing rib 41 extending in the front-back direction of the body intersects a reinforcing rib 41 extending in the left-right direction of the body, as shown in FIGS. 2 and 3. Thus, the reinforcing ribs 41 extend in the front-back direction and the left-right direction of the body from the spread prevention section 43 toward the opposite side to the side where the opening section 42 is located. The reinforcing ribs 41 and the spread prevention section 43 are integrated. That is, the spread prevention section 43 is a portion of the reinforcing ribs 41, and serves to not only prevent spreading of liquid substance sticking to the skid plate 32 but also increase the rigidity of the skid plate 32.

Other Embodiments

Other embodiments obtained by modifying the above embodiment will be illustrated below. Two or more of the other embodiments below may be combined and applied to the above embodiment as long as no contradiction arises. Note that the scope of the present invention is not limited to the content of each embodiment.

(1) The above embodiment has described an example where the opening section 42 and the spread prevention section 43 each have a circular shape, but the present invention is not limited to the above embodiment. Alternatively, the opening section 42 and the spread prevention section 43 may each have a rectangular shape, for example. Further, the opening section 42 and the spread prevention section 43 may have different shapes.

(2) The above embodiment has described an example where the spread prevention section 43 is located at a position where a reinforcing rib 41 extending in the front-back direction of the body intersects a reinforcing rib 41 extending in the left-right direction of the body, but the present invention is not limited to the above embodiment. For example, the spread prevention section 43 may be separate from the reinforcing ribs 41. Further, the reinforcing ribs 41 may constitute a portion of the spread prevention section 53, i.e. the opening section 52 may be surrounded by a combination of a linear reinforcing rib 41 and a spread prevention section 53 having a semicircular shape, as shown in FIG. 3.

(3) The above embodiment has described an example where the opening section 42 and the spread prevention section 43 are integrated with the skid plate 32, but the present invention is not limited to the above embodiment. Alternatively, the opening section 42 and the spread prevention section 43 may each be constituted by a rectangular tubular member or the like, and attached to the upper face portion of the skid plate 32, for example.

(4) The above embodiment has described an example where the opening section 42 is located in an area of the skid plate 32 that opposes the drain outlet 45b of the oil pan 8a, but the present invention is not limited to the above embodiment. For example, in the case of a multipurpose vehicle equipped with a radiator, the opening section 42 may alternatively be located at a position opposing a drain outlet for discharging radiator cooling water.

(5) The present invention is applicable to a multipurpose vehicle to be used to move people or transport loads, or for recreation or the like.

What is claimed is:

1. A multipurpose vehicle, comprising:
   drain outlet for waste fluid;
   a skid plate covering a body of the multipurpose vehicle from below and having an opening in an area facing the drain outlet;
   a spread prevention section surrounding the opening and configured to prevent spread of liquid near the opening; and
   a reinforcement section laterally extending from the spread prevention section in a front-back direction and in a left-right direction, where the front-back direction corresponds to a front-back direction of the multipurpose vehicle and the left-right direction corresponds to a left-right direction of the multipurpose vehicle when the skid plate is attached to the multipurpose vehicle,
   wherein the reinforcement section comprises a plurality of front-back reinforcement ribs extending linearly in the front-back direction and a plurality of left-right reinforcement ribs extending linearly in the left-right direction, and the spread prevention section is disposed at a position where a front-back reinforcement rib intersects a left-right reinforcement rib.

2. The multipurpose vehicle according to claim 1, wherein:
   the spread prevention section protrudes upward from an upper face of the skid plate.

3. The multipurpose vehicle according to claim 1, wherein:
   each reinforcement rib of the plurality of reinforcement ribs is integral with the skid plate.

4. The multipurpose vehicle according to claim 3, wherein:
   the reinforcement section protrudes upward from an upper face of the skid plate.

5. The multipurpose vehicle according to claim 3, wherein:
   the plurality of reinforcement ribs are formed by bending.

6. The multipurpose vehicle according to claim 1, wherein:
   the drain outlet is for discharging oil.

7. The multipurpose vehicle according to claim 1, wherein:
   the drain outlet is for discharging radiator cooling water.

8. The multipurpose vehicle according to claim 1, wherein:
   the spread prevention section is disposed at a position where a front-back reinforcement rib intersects a left-right reinforcement rib.

9. The multipurpose vehicle according to claim 1, wherein:
the spread prevention section and the reinforcement section are integral such that at least a portion of the spread prevention section is at least partially formed by the front-back reinforcement rib and by the left-right reinforcement rib that intersect where the spread prevention section is disposed.

10. The multipurpose vehicle according to claim 1, wherein:
the spread prevention section is separate from the reinforcement section such that the front-back reinforcement rib and the left-right reinforcement rib that intersect where the spread prevention section is disposed comprise semicircle portions that surround the spread prevention section.

11. The multipurpose vehicle according to claim 1, wherein:
the skid plate comprises a plurality of plates attached between a left outer front frame and a right outer front frame and between a left rear lower frame and a right rear lower frame, the multipurpose vehicle comprises at least two drain outlets for waste fluid, and at least two plates of the plurality of plates comprise an unobstructed opening in an area facing one of the at least two drain outlets.

12. The multipurpose vehicle according to claim 11, wherein:
a first plate of the plurality of plates is attached between a left diagonal support member, a right diagonal support member and a first lateral support member,
a second plate of the plurality of plates is attached between the first lateral support member and a second lateral support member,
a third plate of the plurality of plates is attached between the second lateral support member and a third lateral support member,
a fourth plate of the plurality of plates is attached between the third lateral support member and a fourth lateral support member, and
a fifth plate of the plurality of plates is attached between the fourth lateral support member and a fifth lateral support member.

* * * * *